US010616359B2

(12) United States Patent
Nakahara et al.

(10) Patent No.: US 10,616,359 B2
(45) Date of Patent: Apr. 7, 2020

(54) INFORMATION COMMUNICATION SYSTEM, INTERMEDIATE SERVER, AND RECORDING MEDIUM

(71) Applicant: KONICA MINOLTA, INC., Chiyoda-ku (JP)

(72) Inventors: Kei Nakahara, Suita (JP); Masato Fujii, Nagaokakyo (JP); Kouichi Tomita, Kawanishi (JP); Shinya Satomi, Suita (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 433 days.

(21) Appl. No.: 14/475,731

(22) Filed: Sep. 3, 2014

(65) Prior Publication Data
US 2015/0089033 A1     Mar. 26, 2015

(30) Foreign Application Priority Data

Sep. 20, 2013  (JP) .................................. 2013-195666

(51) Int. Cl.
*H04L 29/08* (2006.01)
*G06F 3/12* (2006.01)

(52) U.S. Cl.
CPC ............ *H04L 67/28* (2013.01); *G06F 3/1204* (2013.01); *G06F 3/1231* (2013.01); *G06F 3/1285* (2013.01)

(58) Field of Classification Search
CPC ......... H04L 67/34; H04L 67/28; H04L 29/08; H04L 29/06; H04L 29/08981;
(Continued)

(56) References Cited

U.S. PATENT DOCUMENTS

2005/0120354 A1* 6/2005 Sunada ............... G06F 11/3433
  719/310
2005/0169288 A1* 8/2005 Kamiwada ........ H04L 29/12009
  370/401

(Continued)

FOREIGN PATENT DOCUMENTS

JP     2006-203731 A     8/2006
JP     2006-221521 A     8/2006
(Continued)

OTHER PUBLICATIONS

Office Action (Examiner's Decision to Grant a Patent) dated Jun. 30, 2015, by the Japanese Patent Office in corresponding Japanese Patent Application No. 2013-195666, and an English Translation of the Office Action. (6 pages).

*Primary Examiner* — Tonia L Dollinger
*Assistant Examiner* — Mehulkumar J Shah
(74) *Attorney, Agent, or Firm* — Buchanan Ingersoll & Rooney PC

(57) ABSTRACT

An intermediate server acting as a relay between an information processing apparatus and an external server includes a first registration control unit that transmits registration information regarding an application software service of the external server to the information processing apparatus, and causes the information processing apparatus to execute a registration operation of pre-registering information for receiving the application software service; a storage unit that stores a template for re-registration information for re-registering the application software service; a detection unit that detects a change in network identification information regarding the intermediate server; and a second registration control unit that, when the change is detected, generates re-registration information that includes changed new network identification information regarding the intermediate server on the basis of the template, transmits the re-registration information to the information processing apparatus, and causes the information processing apparatus to execute a re-registration operation of re-registering the application software service.

9 Claims, 15 Drawing Sheets

(58) Field of Classification Search
CPC ........... H04L 29/08072; H04L 41/0806; G06F 3/1285; G06F 3/1231; G06F 3/1204; G06F 9/4416
USPC .............. 709/222, 220, 228; 713/1; 710/104
See application file for complete search history.

(56) References Cited

U.S. PATENT DOCUMENTS

| | | | |
|---|---|---|---|
| 2008/0091776 A1* | 4/2008 | Miyamoto | H04L 12/2809 709/203 |
| 2009/0177785 A1* | 7/2009 | Reid | H04L 29/06027 709/228 |
| 2009/0287831 A1* | 11/2009 | Nakagawa | H04L 63/08 709/228 |
| 2010/0198966 A1* | 8/2010 | Kaneko | H04L 41/0853 709/224 |
| 2012/0069380 A1 | 3/2012 | Sugimoto | |

FOREIGN PATENT DOCUMENTS

| | | |
|---|---|---|
| JP | 2012-070068 A | 4/2012 |
| JP | 2012-093940 A | 5/2012 |
| JP | 2012-147484 A | 8/2012 |

\* cited by examiner

Fig.9

```
<AppReqExtSetApplication>
 <FunctionVersion>1.0</FunctionVersion>
  <OperatorInfo>
   <AuthKey>kmuser/spdpass</AuthKey>
  </OperatorInfo>
   <RegistrationType>default</RegistrationType>
  <ApplicationRegistration>
   <Name>AppABC</Name>
   <ID>STR1003JP</ID>
   <NO>20</NO>
   <IconType>default</IconType>
  </ApplicationRegistration>
  <Location>
   <IP>192.168.0.10</IP>
   <HostName>SaaSGateway01</HostName>
  </Location>
 </AppReqExtSetApplication>
```

```
<AppReqExtSetApplication>
  <FunctionVersion>1.0</FunctionVersion>
   <OperatorInfo>
     <AuthKey>kmuser/spdpass</AuthKey>
   </OperatorInfo>
    <RegistrationType>default</RegistrationType>
  <ApplicationRegistration>
   <Name>AppABC</Name>
   <ID>STR1003JP</ID>
   <NO>20</NO>
   <IconType>default</IconType>
  </ApplicationRegistration>
  <Location>
    <IP></IP>
    <HostName></HostName>
  </Location>
</AppReqExtSetApplication>
```

| TEMPLATE ID | TARGET DEVICE ID |
|---|---|
| AppTemplate_0001 | device_0001 |
| AppTemplate_0002 | device_0001 |

401 → (first row)
402 → (second row)

| TARGET DEVICE ID | IP ADDRESS |
|---|---|
| device_0001 | 192.168.0.11 |
| device_0002 | 192.168.0.12 |
| device_0003 | 192.168.0.13 |

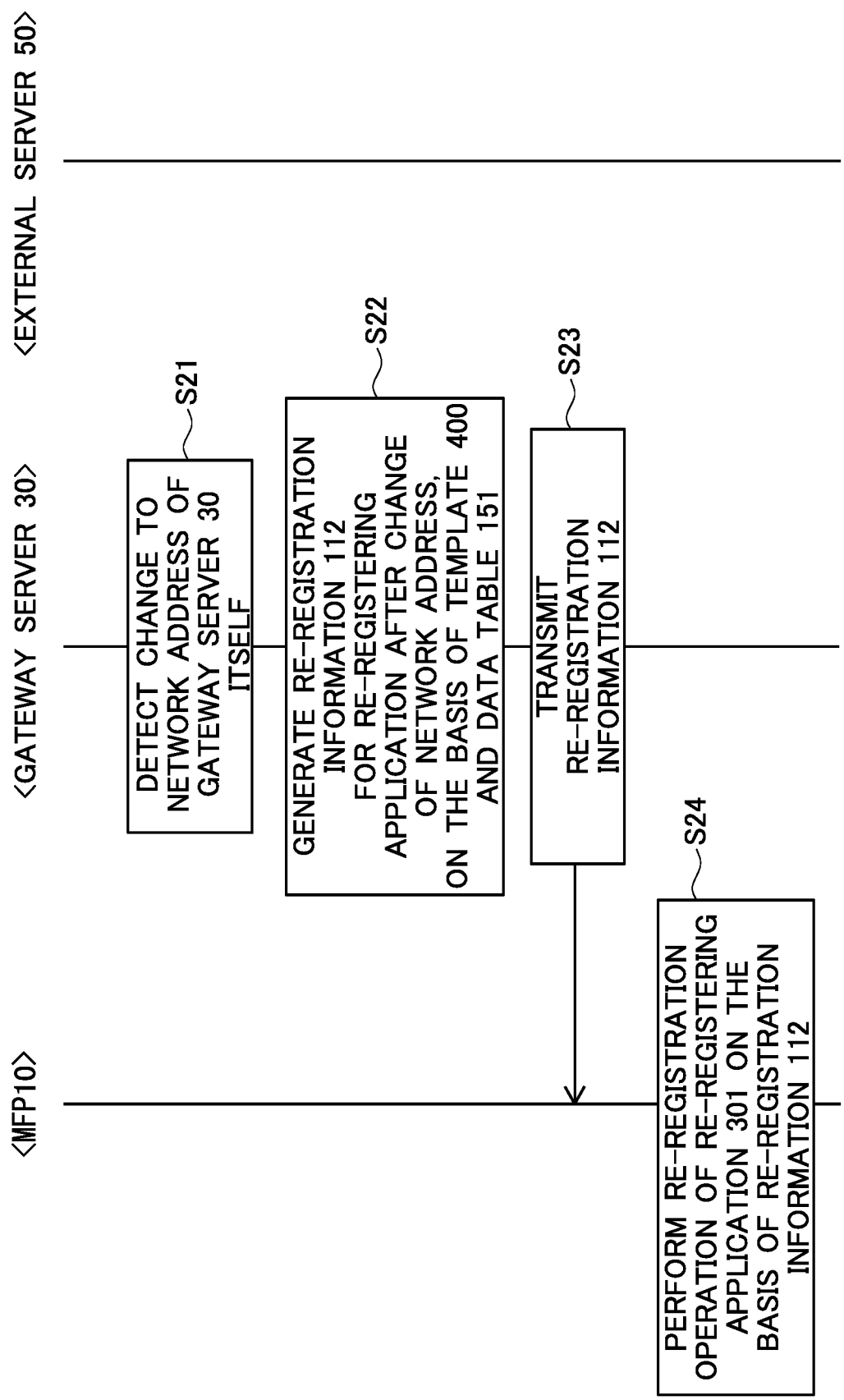

*Fig.15*

```
<AppReqExtSetApplication>
  <FunctionVersion>1.0</FunctionVersion>
   <OperatorInfo>
     <AuthKey>kmuser/spdpass</AuthKey>
   </OperatorInfo>
   <RegistrationType>default</RegistrationType>
  <ApplicationRegistration>
   <Name>AppABC</Name>
   <ID>STR1003JP</ID>
   <NO>20</NO>
   <IconType>default</IconType>
  </ApplicationRegistration>
  <Location>
   <IP>192.168.0.20</IP>
   <HostName>SaaSGateway01</HostName>
  </Location>
</AppReqExtSetApplication>
```

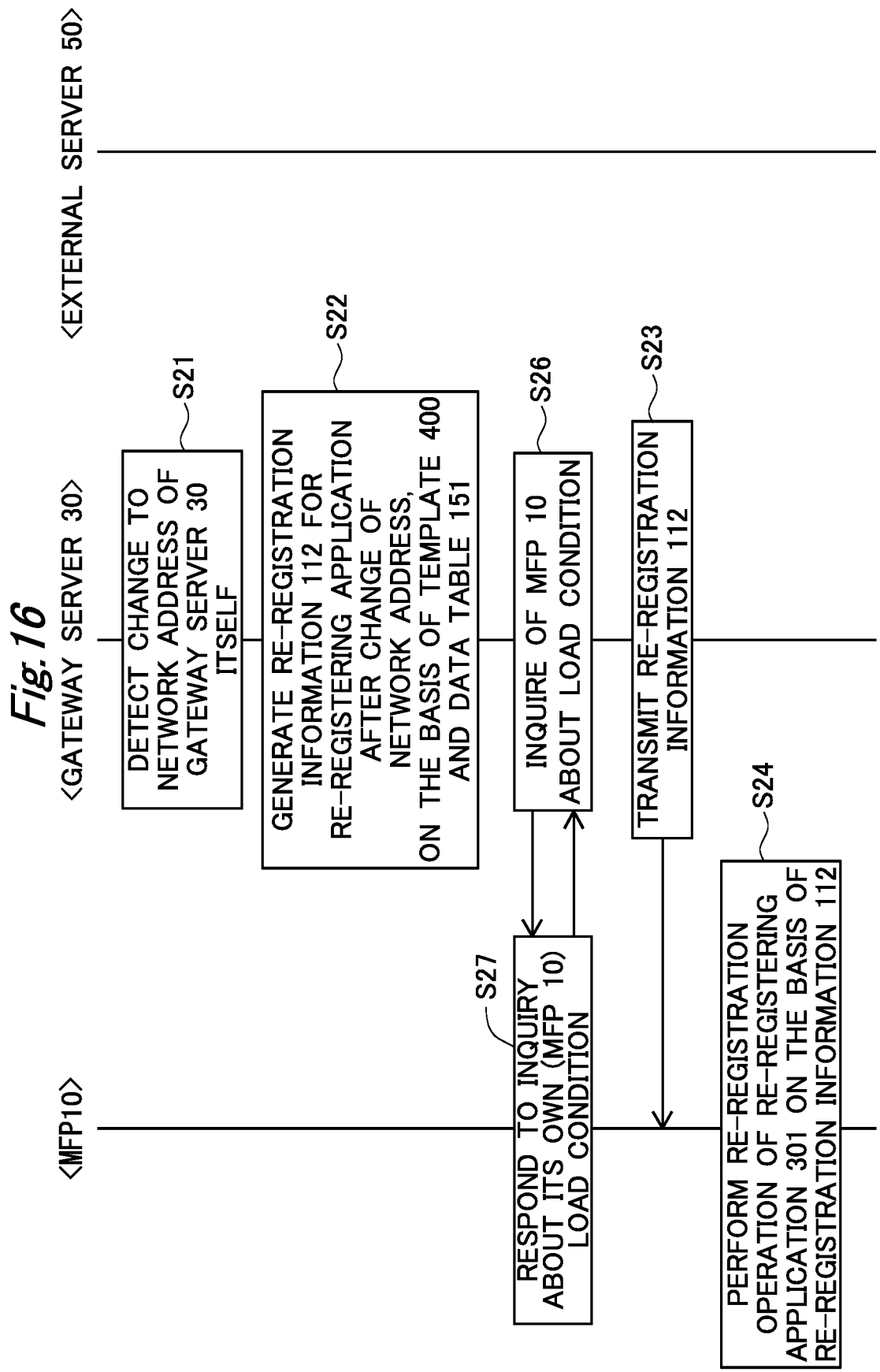

| TARGET DEVICE ID | IP ADDRESS | HOST NAME | MAC ADDRESS |
| --- | --- | --- | --- |
| device_0001 | 192.168.0.11 | MFP001 | 00-1D-E1-51-69-B9 |
| device_0002 | 192.168.0.12 | MFP002 | 00-1D-E1-51-69-D9 |
| device_0001 | 192.168.0.13 | MFP003 | 00-1D-E1-51-69-E9 |

…

INFORMATION COMMUNICATION SYSTEM, INTERMEDIATE SERVER, AND RECORDING MEDIUM

This application is based on Japanese Patent Application No. 2013-195666 filed on Sep. 20, 2013, the contents of which are hereby incorporated by reference.

BACKGROUND OF THE INVENTION

Technical Field

The present invention relates to an information communication system that includes an information processing apparatus such as a Multi-Functional Peripheral (MFP) and technology related thereto.

Related Art

There are techniques using a cloud in information processing apparatuses such as MFPs. Such techniques allow, for example, an MFP to access a cloud server that provides services such as a download printing service and print out document data or the like stored in a cloud. To be more specific, a communication destination or the like in the cloud is registered in advance in the MFP so that the cloud server can be accessed in response to pressing of a specific button displayed on a control panel of the MFP.

There are also techniques for providing an intermediate server and establishing communications between an MFP and a cloud server via the intermediate server when the MFP accesses the cloud server (see Japanese Patent Application Laid-Open No. 2007-312335, for example).

The techniques using an intermediate server have advantages such as being able to access a specific device in a LAN from a cloud server. In the case of using an intermediate server for communications between an MFP and a cloud server, the Internet Protocol address (IP address) or the like of the intermediate server, for example, is registered as a communication destination when using a cloud, instead of a communication destination in the cloud server.

Incidentally, there are cases in which the IP address of an intermediate server located in a LAN is changed as a result of a change in a company's LAN configuration due to reorganization or the like within the company. If the IP address of the intermediate server has been changed, an MFP cannot identify the intermediate server having the changed IP address in the network without any action. That is, the MFP cannot use the old IP address to communicate with the intermediate server.

In this case, if, for example, the user again performs a registration operation similar to an initial registration operation that is accompanied by accessing the cloud server, using the changed IP address or the like of the intermediate server, it is possible to reflect the changed IP address of the intermediate server in the registration content of the MFP, and the MFP can again communicate with the intermediate server.

However, such a re-registration operation places a heavy burden on the user.

SUMMARY OF THE INVENTION

It is an object of the present invention to provide a technique that is able to prevent an increase in the burden on the user when changing a network configuration.

According to a first aspect of the present invention, an information communication system includes an information processing apparatus located in a local area network, an external server that is located outside the local area network, and provides an application software service to the information processing apparatus via network communications, and an intermediate server that is located in the local area network, and acts as a relay between the external server and the information processing apparatus. The application software service is provided by the external server being accessed by the information processing apparatus via the intermediate server. The intermediate server includes a first registration control unit that transmits registration information regarding the application software service to the information processing apparatus on the basis of information received from the external server, and causes the information processing apparatus to execute a registration operation of registering information for receiving the application software service in the information processing apparatus, a storage unit that stores a template that is based on the registration information, the template being a template for re-registration information that is for re-registering the application software service in the information processing apparatus, a detection unit that detects a change in network identification information regarding the intermediate server, and a second registration control unit that, when the change in the network identification information is detected, generates the re-registration information that includes changed new network identification information regarding the intermediate server on the basis of the template, transmits the re-registration information to the information processing apparatus, and causes the information processing apparatus to execute a re-registration operation of re-registering the application software service.

According to a second aspect of the present invention, an intermediate server acts as a relay between an information processing apparatus located in a local area network and an external server located outside the local area network, and includes a first registration control unit that transmits registration information regarding an application software service of the external server to the information processing apparatus on the basis of information received from the external server, and causes the information processing apparatus to execute a registration operation of pre-registering information for receiving the application software service in the information processing apparatus, a storage unit that stores a template that is based on the registration information, the template being a template for re-registration information that is for re-registering the application software service in the information processing apparatus, a detection unit that detects a change in network identification information regarding the intermediate server that is located in the local area network, and a second registration control unit that, when the change in the network identification information is detected, generates re-registration information that includes changed new network identification information regarding the intermediate server on the basis of the template, transmits the re-registration information to the information processing apparatus, and causes the information processing apparatus to execute a re-registration operation of re-registering the application software service.

According to a third aspect of the present invention, a non-transitory computer-readable recording medium records a program for causing a computer built into an intermediate server that acts as a relay between an information processing apparatus located in a local area network and an external server located outside the local area network to execute the steps of a) transmitting registration information regarding an application software service of the external server to the information processing apparatus on the basis of information received from the external server, and causing the information processing apparatus to execute a registration operation of registering information for receiving the application software service in the information processing apparatus, b) storing a template that is based on the registration information, the template being a template for re-registration information that is for re-registering the application software service in the information processing apparatus, c) detecting a change in network identification information regarding the intermediate server that is located in the local area network, and d) when the change in the network identification information is detected, generating re-registration information that includes changed new network identification information regarding the intermediate server on the basis of the template, transmitting the re-registration information to the information processing apparatus, and causing the information processing apparatus to execute a re-registration operation of re-registering the application software service.

These and other objects, features, aspects and advantages of the present invention will become more apparent from the following detailed description of the present invention when taken in conjunction with the accompanying drawings.

BRIEF DESCRIPTION OF THE DRAWINGS

FIG. 9 shows an example of registration information for registering an application.

FIG. 10 shows an example of a template for re-registering the application.

FIG. 11 illustrates a data table that defines a correspondence relationship between a template and an MFP for each application.

FIG. 12 illustrates a data table that stores IP addresses of MFPs.

FIG. 14 is a timing chart showing an example of the re-registration operation.

FIG. 15 shows an example of re-registration information for reregistering the application.

FIG. 16 illustrates a re-registration operation according to a second embodiment.

FIG. 17 illustrates a data table that additionally stores MAC addresses of the MFPs.

DETAILED DESCRIPTION OF THE PREFERRED EMBODIMENTS

Hereinafter, embodiments of the present invention will be described with reference to the drawings.

1. First Embodiment 1-1. Overall Configuration

Figure 1:
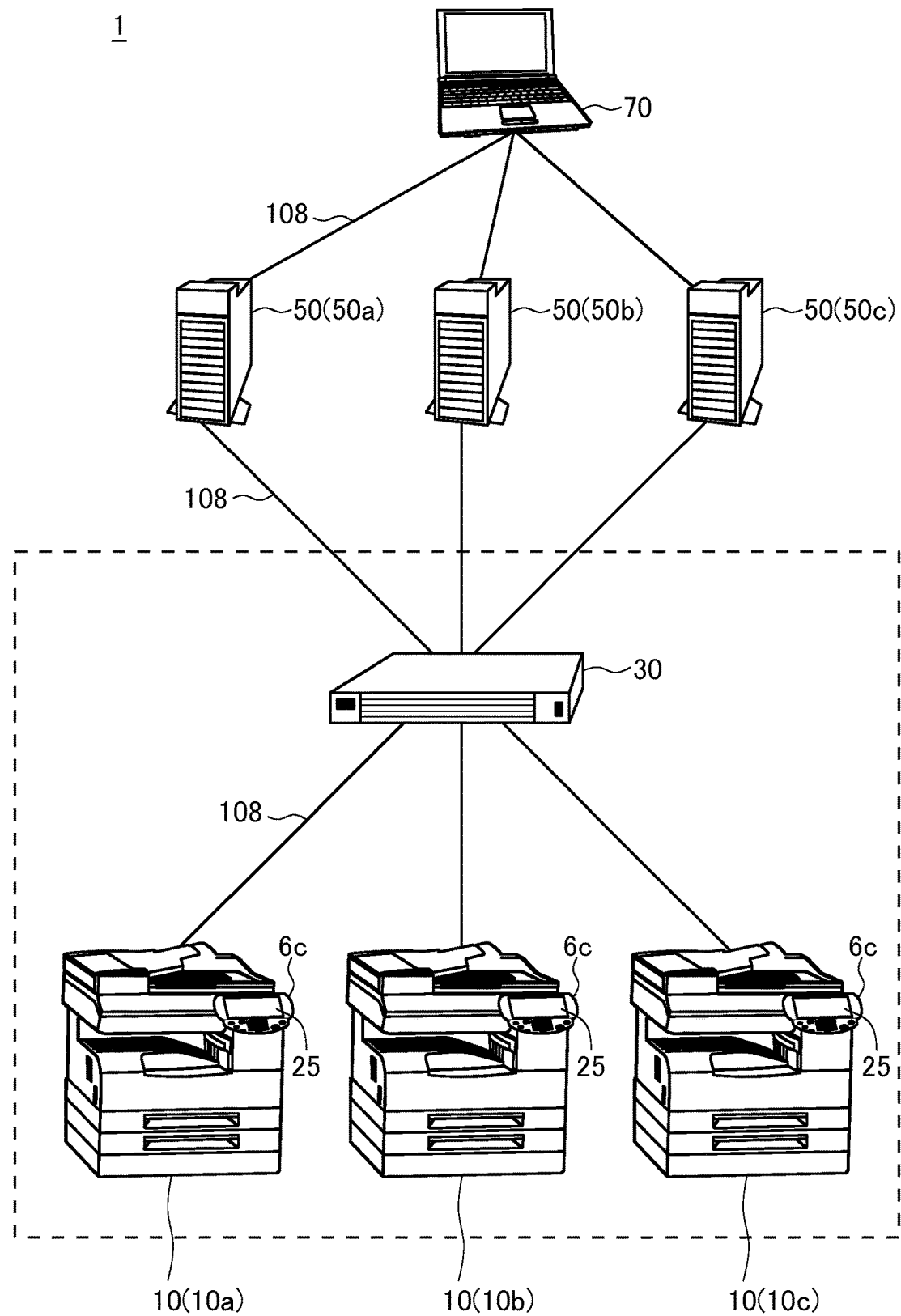
FIG. 1 is a schematic diagram illustrating a configuration of an information communication system.

FIG. 1 is a schematic diagram illustrating a configuration of an information communication system 1. As illustrated in FIG. 1, the information communication system 1 includes a plurality of Multi-Functional Peripherals (also simply referred to as "MFPs") 10 (10a, 10b, 10c, and so on), a server computer 30, a plurality of server computers 50 (50a, 50b, 50c, and so on), and a client computer 70. The MFPs 10 are also referred to as "information processing apparatuses" or "communication apparatuses."

The constituent elements 10, 30, 50, and 70 of this system 1 are communicably connected to one another via a network 108. The network 108 may, for example, be a local area network (LAN) or the Internet. The connection to the network 108 may be either wired or wireless connection.

The MFPs 10 are located in a certain local area network (LAN) (in the range enclosed by the broken line in FIG. 1).

On the other hand, the server computers 50 are located outside the local area network and are also referred to as "external servers." The server computers (external servers) 50 are so-called cloud servers that make cloud computing possible. To be more specific, the external servers 50 provide application software 300 (not shown) in the form of services. In other words, the external servers 50 each include application software (also referred to as "SaaS application") 300 that functions as Software-as-a-Service (SaaS).

The external servers 50 provides application software services (e.g., a download printing service) to the MFPs 10 through network communications. The information communication system 1 establishes communications between the MFPs 10 and devices on the cloud side (external servers 50) to provide various services to users of the MFPs 10.

For example, a user is able to access document data, which is stored in advance in a cloud (specifically, an external server 50), using an arbitrary MFP 10 among the plurality of MFPs 10 and for example to print out a document indicated by the document data (data regarding an output image), using the MFP 10. Such a download printing service is provided through an application software program (application on the cloud side) 300 installed on the external server 50. The download printing service can be provided not only through the application software program 300 in the external server 50 but also through data communications (e.g., transmission and reception of the document data) between the MFP 10 and the external server 50.

The server computer 30 is a server that is located in the aforementioned local area network (LAN to which the MFPs 10 belong) and acts as a relay between the external servers 50 and the MFPs 10, and is also referred to as an "intermediate server." The server computer 30 is also referred to as a gateway server (or simply a gateway).

More specifically, the intermediate server 30 is an intermediate server (intermediate server for SaaS) for executing a cloud application and is thus also referred to as a SaaS gateway. Note that it is assumed here that a device (network gateway) (not shown) that has a function of, for example, routing the local area network and external networks is provided separately from the intermediate server 30 on a communication path between the external servers 50 and the intermediate server 30. The present embodiment is, however, not limited to this, and the intermediate server 30 may function as a network gateway that has such a routing function, for example.

Incidentally, devices (e.g., MFPs 10) in a LAN normally cannot be directly accessed by devices outside the LAN. The intermediate server 30 thus has the function of, when the cloud-side application 300 is executed, acting as a relay between the MFPs 10 and the external servers 50 and controlling access between both the devices 10 and 50, thereby achieving smooth information transmission between the devices. In the information communication system 1, the intervention of the intermediate server 30 allows devices outside the LAN to directly access the devices (MFPs 10) in the LAN. The intermediate server 30 also has a firewall function and serves to enhance security. Note that the intermediate server 30 may also be provided to achieve other functions.

The client computer (also simply referred to as a "client") 70 is capable of accessing the external servers 50 via the network 108, using its own web browser (also simply referred to as a "browser"). As will be described later, the client 70 transmits, for example, a registration instruction to register information for using the application 300 (SaaS application 300) in an MFP 10, to an external server 50. Note that the client computer 70 may be provided outside the LAN (local area network) to which the MFPs 10 belong, or may be provided within the LAN.

1-2. Configuration of MFP 10

The MFPs 10 are devices (also called "Multi-Functional Peripherals") that have functions such as a scan function, a print function, a copy function, and a facsimile communication function. The MFPs 10 are also referred to as "image processing apparatuses" or "image forming apparatuses," for example. Similarly, the information communication system 1 is also referred to as an "image processing system" or an "image forming system," for example.

Figure 2:
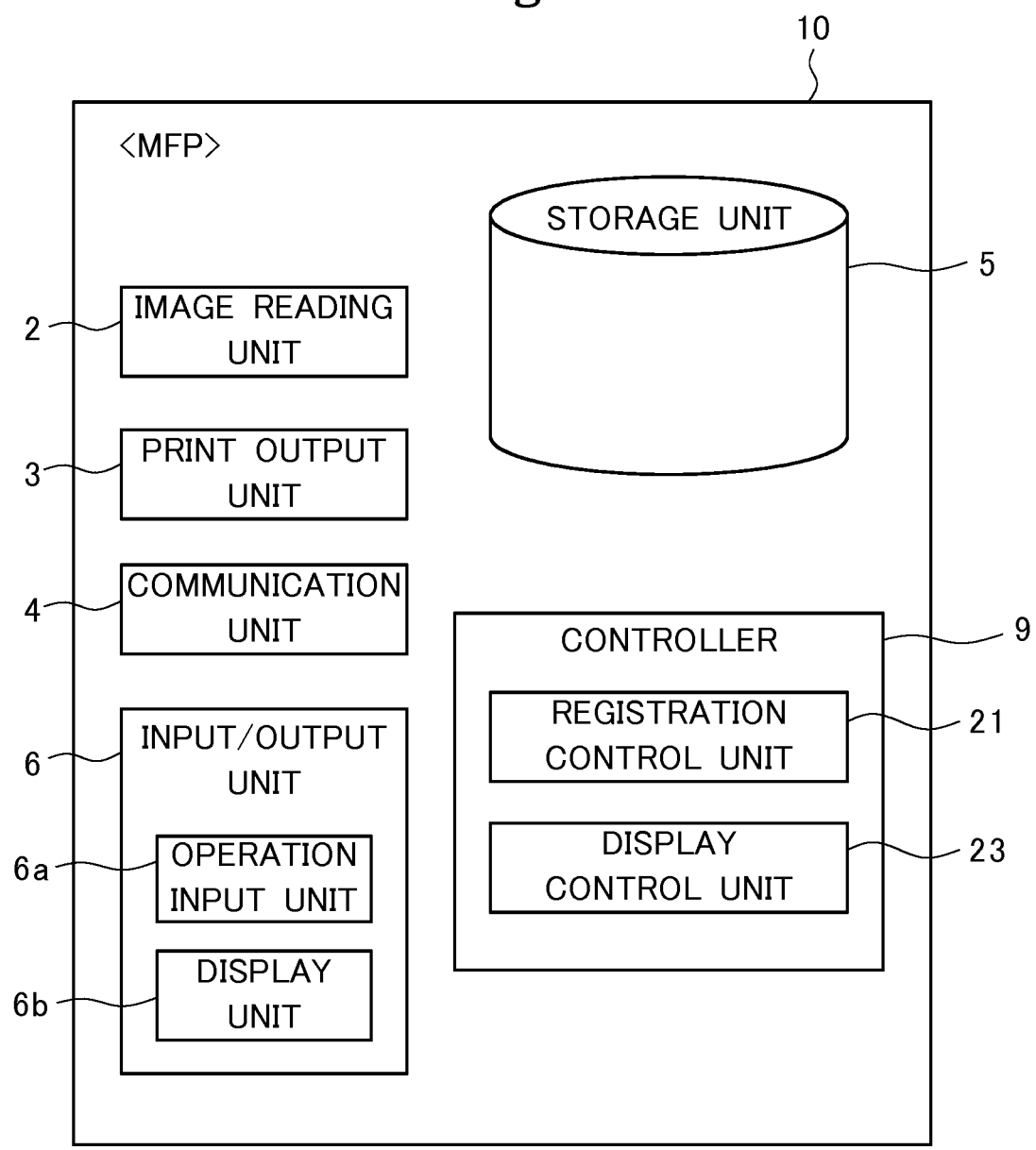
FIG. 2 illustrates functional blocks of an MFP.

As illustrated in the functional block diagram of FIG. 2, the MFPs 10 each include an image reading unit 2, a print output unit 3, a communication unit 4, a storage unit 5, an input/output unit 6, and an overall control unit (also referred to as a "controller") 9, for example, and achieves various types of functions by operating these units in combination.

The image reading unit 2 is a processing unit that is configured to optically read an original document placed at a predetermined position on the MFP 10 and generate (form) image data regarding the original document (also referred to as a "document image").

The print output unit 3 is an output unit that is configured to print out (form) an image on various types of media such as paper on the basis of image data regarding a target image.

The communication unit 4 is a processing unit that is capable of facsimile communications via a public network or the like. The communication unit 4 is also capable of network communications via the communication network 108. In the network communications, various types of protocols such as Transmission Control Protocol/Internet Protocol (TCP/IP) or File Transfer Protocol (FTP) are used. Using the network communications allows the MFP 10 to exchange various types of data with desired destinations.

The storage unit 5 is constituted by a storage device such as a hard disk drive (HDD) or a non-volatile memory. The storage unit 5 stores, for example, the document image (image data) generated by the image reading unit 2 or the like.

The input/output unit 6 includes an operation input unit 6a that is configured to receive input to the MFP 10, and a display unit 6b that is configured to display and output various types of information. To be more specific, the MFP 10 is provided with an operation panel 6c (see FIG. 1) including a touch panel (touch screen) 25. The touch panel 25 is constituted by embedding a piezoelectric sensor or the like in a liquid crystal display panel, and functions as part of the display unit 6b and also functions as part of the operation input unit 6a.

The overall control unit 9 is a control device that is built into the MFP 10 and performs overall control of the MFP 10. The overall control unit 9 is configured as a computer system that includes a CPU and various types of semiconductor memories (e.g., a RAM and a ROM), for example. The overall control unit 9 achieves various types of processing units by the CPU executing a predetermined software program (hereinafter also simply referred to as a "program") 201 (not shown) stored in the ROM (e.g., an EEPROM). Note that the program 201 may be installed in the MFP 10 by being downloaded via the network 108. Alternatively, the program 201 may be installed in the MFP 10 by being recorded in any of various types of portable recording media (e.g., a USB memory) (in other words, various types of computer-readable non-transitory recording media) and read out from the recording medium.

Specifically, the overall control unit 9 achieves various types of processing units including a registration control unit 21 and a display control unit 23 by executing the program 201 (see FIG. 2). The registration control unit 21 is a processing unit that is configured to control an operation of registering information for using the application 300 (SaaS application 300) (e.g., 301) in the MFP 10. The display control unit 23 is a processing unit that is configured to control a display operation of the display unit 6b.

1-3. Configuration of External Server 50

The external servers 50 are servers that provide applications in the form of services. In the present example, the external server 50a is assumed to be a server that provides an application (also referred to as an "application software service") 301. Similarly, the external server 50b is assumed to be a server that provides an application 302, and the external server 50c is assumed to be a server that provides an application 303.

The external servers 50 each include an overall control unit 59 that is configured as a computer system including a CPU and various types of semiconductor memories (e.g., a RAM and a ROM), for example. The overall control unit 59 achieves various types of processing units by the CPU executing a predetermined software program (hereinafter, also simply referred to as a "program") 205 stored in the ROM (e.g., an EEPROM). Note that the program 205 may be installed in the external server 50 by being downloaded via the network 108. Alternatively, the program 205 may be installed in the external server 50 by being recorded in any of various types of portable recording media (e.g., a CD-ROM or a USB memory) (in other words, various types of computer-readable non-transitory recording media) and read out from the recording medium.

Figure 3:
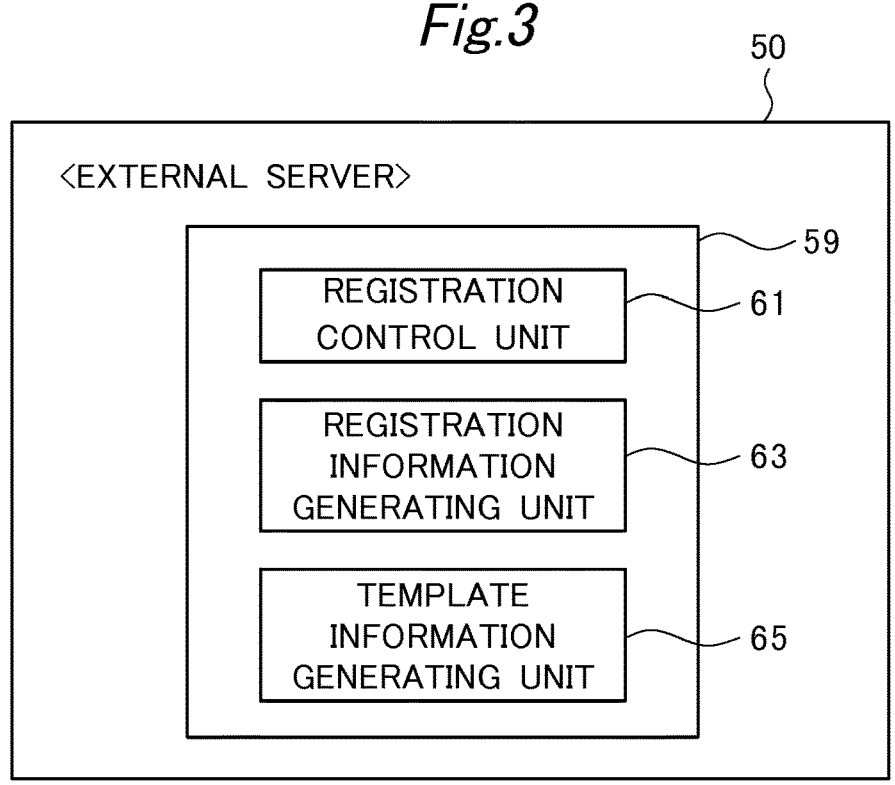
FIG. 3 illustrates functional blocks of an external server.

Specifically, the external server 50 achieves various types of processing units including a registration control unit 61, a registration information generating unit 63, and a template information generating unit 65 by executing the program 205 (see FIG. 3). FIG. 3 illustrates functional blocks of the overall control unit 59 of the external server 50.

The registration control unit 61 is a processing unit that is configured to control an operation of registering information for using the application 300 (e.g., 301) in an MFP 10. The registration control unit 61 controls the operation of registering application information in an MFP 10 in cooperation with a registration control unit 41 (FIG. 4) of the intermediate server 30 and the registration control unit 21 (FIG. 2) of the MFP 10.

The registration information generating unit 63 is a processing unit that is configured to generate registration information 111 for registering the application 300.

The template information generating unit 65 is a processing unit that is configured to generate a template 400 for the application 300 on the basis of the registration information 111 for registering the application 300, for example.

1-4. Configuration of Intermediate Server 30

The intermediate server 30 also includes an overall control unit 39 that is configured as a computer system including a CPU and various types of semiconductor memories (e.g., a RAM and a ROM), for example. The overall control unit 39 achieves various types of processing units by the CPU executing a predetermined software program (hereinafter, also simply referred to as a "program") 203 stored in the ROM (e.g., an EEPROM). Note that the program 203 may be installed in the intermediate server 30 by being downloaded via the network 108. Alternatively, the program 203 may be installed in the intermediate server 30 by being recorded in any of various types of portable recording media (e.g., a CD-ROM or a USB memory) (in other words, various types of computer-readable non-transitory recording media) and read out from the recording medium.

Figure 4:
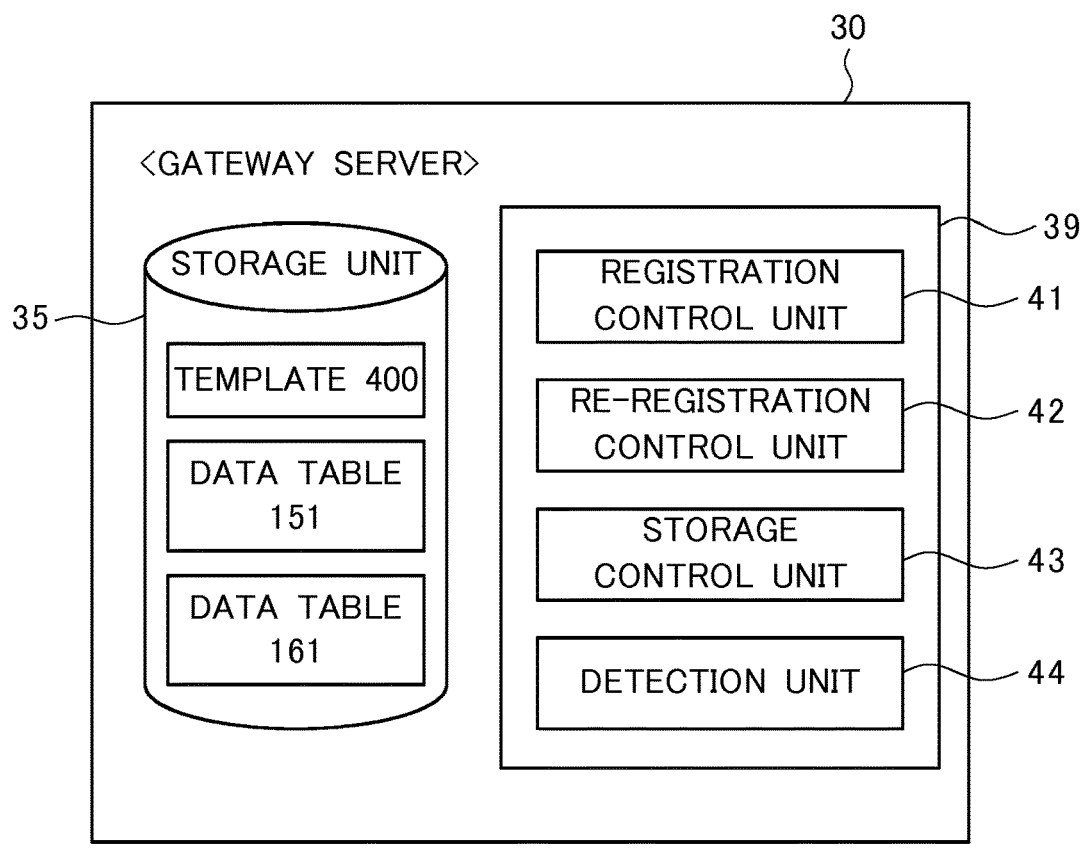
FIG. 4 illustrates functional blocks of an intermediate server.

Specifically, the intermediate server 30 achieves various types of processing units including the registration control unit 41, a re-registration control unit 42, a storage control unit 43, and a detection unit 44 by executing the program 203 (see FIG. 4).

The registration control unit 41 is a processing unit that is configured to control an operation of pre-registering information for using the application 300 (e.g., 301) in an MFP 10. Specifically, on the basis of the information (registration information 111) received from an external server 50, the registration control unit 41 transmits the registration information 111 for registering the application 300 to be executed by the external server 50 to an MFP 10 and causes the MFP 10 to register the application 300.

The storage control unit 43 controls, for example, processing for storing the template 400 for re-registration information for re-registering the application 300 in the MFP 10, in a storage unit 35 of the intermediate server 30. The storage unit 35 stores the template 400 that is based on the registration information 111.

The detection unit 44 is a processing unit that is configured to detect a change in the network address of the intermediate server 30 itself.

The re-registration control unit 42 is a processing unit that is configured to control an operation of reregistering information for using the application 300 (e.g., 301) in advance in an MFP 10. Specifically, the re-registration control unit 42 generates registration information (also referred to as "re-registration information") 112 for registering the application 300 in the MFP 10 after the change in the network address of the intermediate server 30. The re-registration information 112 is information that includes the changed network address (of the intermediate server 30). The re-registration control unit 42 transmits the re-registration information 112 to an MFP 10 and causes the MFP 10 to execute the operation of registering (re-registering) the application 300 (without depending on communications with an external server 50).

1-5. Registration Operation

Figures 7, 8:
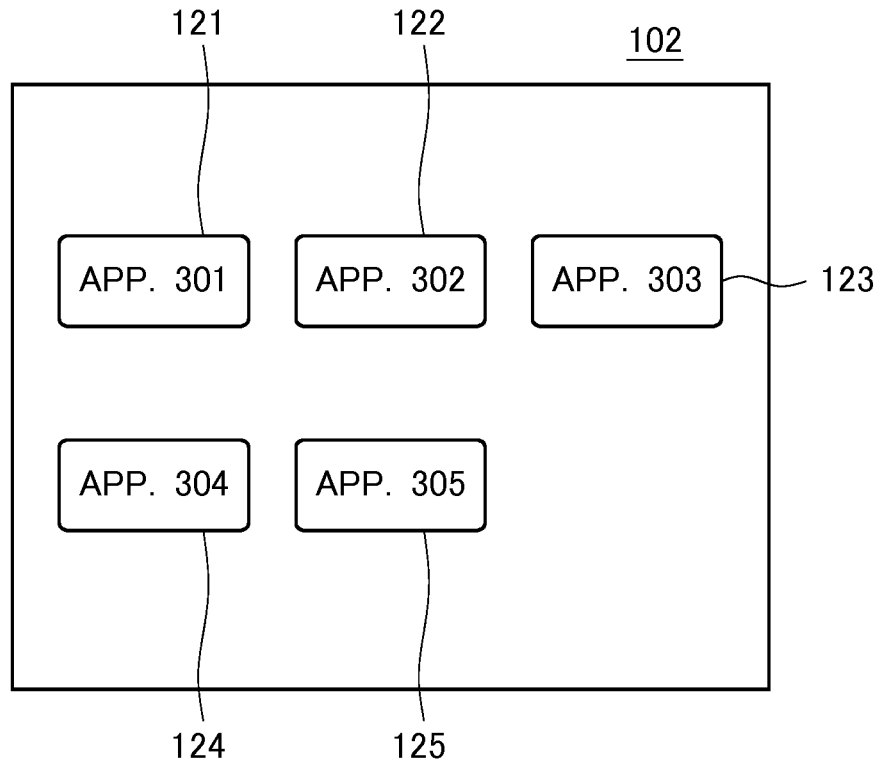
FIG. 7 illustrates an operation screen displayed on a touch panel of the MFP.
FIG. 8 illustrates a registration screen displayed in a client computer.

FIG. 7 illustrates an operation screen (menu screen) 102 displayed on the touch panel 25 (see FIG. 1) of an MFP 10. The operation screen 102 is a screen on which a user selects one of a plurality of applications to be executed.

The MFPs 10 are capable of executing various applications in addition to executing common functions such as copying. The user of an MFP 10 is able to pre-register information regarding each application in the MFP 10 and to execute an application using the operation screen 102.

For example, it is possible to register information (application information) for accessing an external server 50 that provides the aforementioned download printing service in the form of the application 301, in an MFP 10. To be more specific, the application information or the like to be registered is allocated one (e.g., a button 121) of a plurality of menu buttons (121 to 125) displayed on the operation screen 102. This button functions as a call button (start button) for calling the application 301. When the button 121 for starting the application 301 is pressed, the MFP 10 starts to access the external server 50 (50a). The user is thus able to receive the "download printing service."

Figure 5:
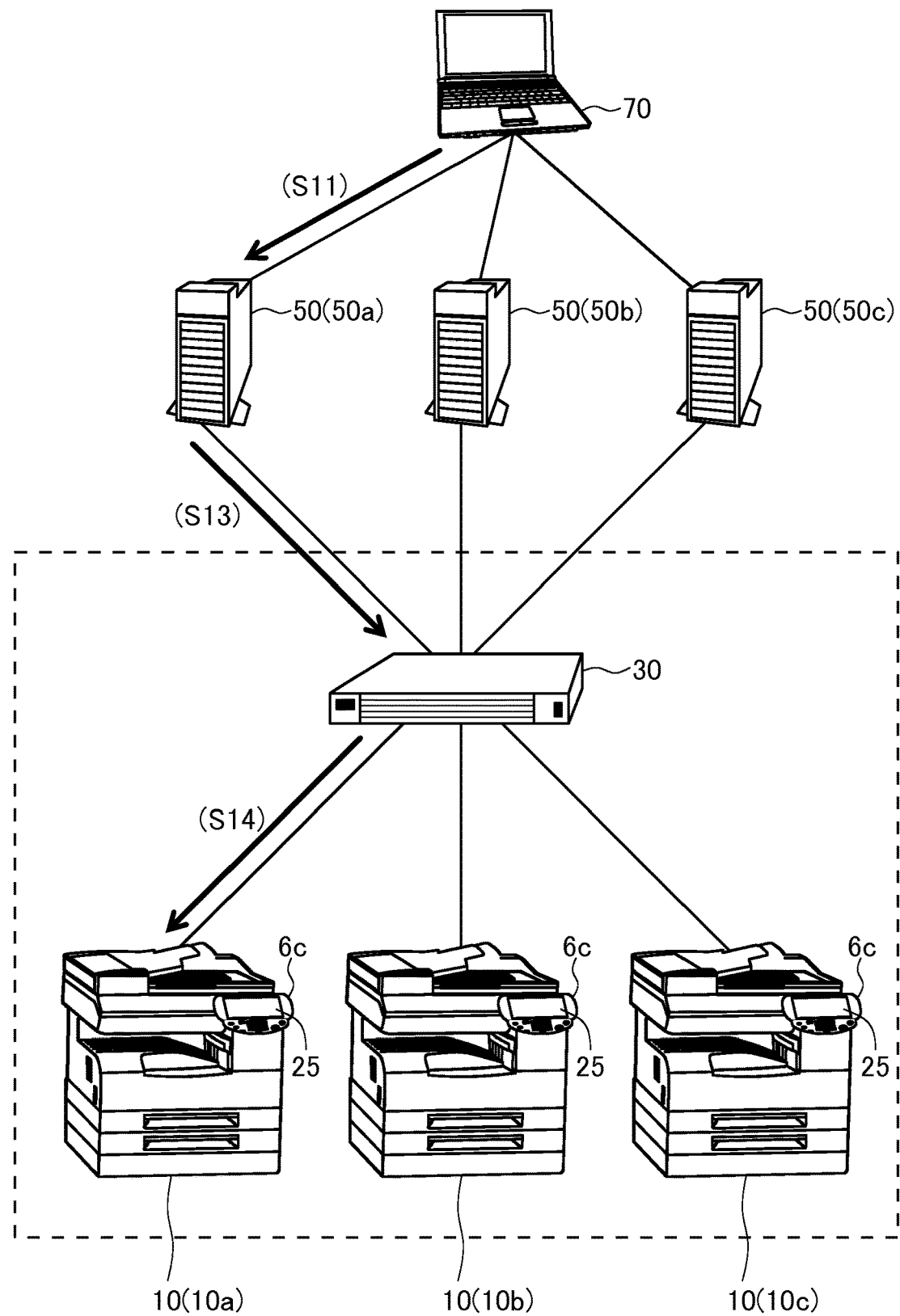
FIG. 5 is a conceptual diagram illustrating an outline of a registration operation.
Figure 6:
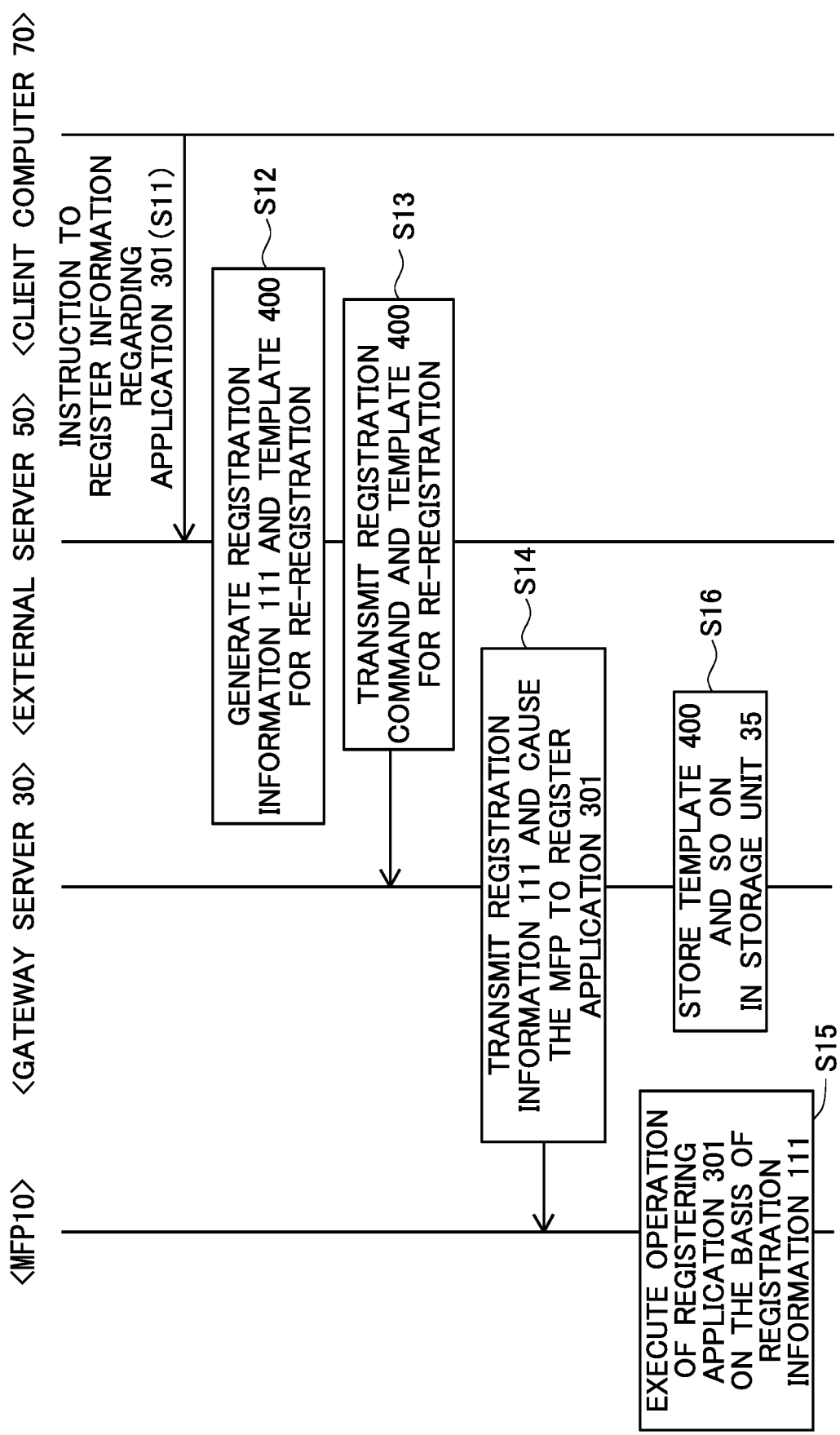
FIG. 6 is a timing chart showing an example of the registration operation.

The following describes the operation of registering the application 301 (specifically, the operation of registering information for accessing the application 301 in the MFP 10) with reference to FIGS. 5 and 6. FIG. 5 is a conceptual diagram illustrating an overview of the registration operation, and FIG. 6 is a timing chart showing an example of the registration operation.

In step S11, a user accesses an external server 50, using the browser of the client computer 70 and gives an instruction to register information regarding the application 301 in a registration target device (in the present example, the MFP 10a).

The operation of giving an instruction to register information for accessing the application 301 in the MFP 10 is performed using the client 70 that is connectable to the external server 50. The browser of the client 70 accesses a specific URL of the external server 50 (50a) that provides the application 301 and displays a registration screen 101 as illustrated in FIG. 8 in response to the user operation.

FIG. 8 illustrates the registration screen 101 displayed in the client 70. The registration screen 101 is a screen for specifying a registration target device in which the application 301 is to be registered. In the registration screen 101 in FIG. 8, a checkbox on the left of "Device 1 (MFP 10a)" is checked, which indicates that "Device 1 (MFP 10a)" is specified as the registration target device for the application 301.

It is assumed here that, prior to the registration operation using the registration screen 101, various registration operations have already been performed in advance, such as registering a plurality of devices (in the present example, the MFPs 10a to 10c) that can be registration target devices for the application 301 (i.e., operation of registering network identification information (e.g., the network address and the host name) regarding each device in the external servers 50). It is also assumed that operations such as registering network identification information or the like regarding the intermediate server 30 in the external servers 50 have already been performed in advance.

After having selected the desired device as the registration target device on the registration screen 101 (FIG. 8), the user presses an "EXECUTE" button on the registration screen 101. In response to the pressing of the button, the browser of the client 70 accesses the external server 50 and transmits a command (registration request command) to register information regarding the application 301 in the registration target device (in the present example, the MFP 10a), to the external server 50.

In step S12, the registration control unit 61 of the external server 50 causes the registration information generating unit 63 and the template information generating unit 65 of the external server 50 to generate the registration information 111 for registering the application 301 and the template 400 for re-registering the application 301. Specifically, the registration control unit 61 first causes the registration information generating unit 63 to generate the registration information 111 for registering the application 301. The registration control unit 61 also causes the template information generating unit 65 to generate the template 400 for re-registering the application 301.

The registration information 111 for registering the application 301 includes not only information (application specific information) regarding the application 301 itself, but also network identification information (access-destination specific information) regarding an access destination device when using the application. The information regarding the application 301 itself contains the application ID, application name, and version of the application 301 and authentication information regarding the application 301, for example. As the network identification information regarding the access destination device when using the application, network identification information (e.g., the Internet Protocol address (IP address) and the host name) regarding the intermediate server 30 is recorded in the registration information 111. As a result, the network identification information regarding the intermediate server 30 is registered as the access destination when using the application 301, instead of direct registration of the network identification information regarding the external server 50.

Note that the intermediate server 30 also stores the original URL of the external server 50 that provides the application 301 and performs processing for converting the address of the access destination of the MFP 10 when having received an access instruction from an MFP 10. Specifically, first, an MFP 10 transmits an instruction to access the application 301 to the intermediate server 30 in response to pressing of the button for executing the application 301. In other words, the access instruction that is accompanied by specifying the application 301 to be accessed is transmitted from the MFP 10 to the IP address that indicates the intermediate server 30. Upon receiving the access instruction, the intermediate server 30 performs processing for converting the address of the access destination of the MFP 10. Specifically, the intermediate server 30 performs conversion processing for converting the access destination of the MFP 10 from the IP address of the intermediate server 30 itself to the original URL of the external server 50 that provides the application 301. This conversion processing is performed based on a data table (not shown) or the like that shows a relationship between the application ID of the application 301 and the original URL of the external server 50 that provides the application 301.

FIG. 9 shows an example of the registration information 111 regarding the application 301. FIG. 9 shows an example of content described using a tag format in the registration information 111. The registration information 111 in FIG. 9 first describes information (application specific information) regarding the application 301 itself. Specifically, information such as the application ID "STR1003JP," application name "AppABC," and version "20" of the application 301 and the authentication information "kmuser/spdpass" regarding the application 301 is described, for example. The registration information 111 also describes network identification information (access-destination specific information) regarding the access destination device when using the application. Specifically, the network identification information (e.g., IP address "192.168.0.10" and host name "SaaS-Gateway01") regarding the intermediate server 30 is described as the network identification information regarding the access destination device. Note that the network identification information (e.g., IP address) regarding the intermediate server 30 is known in advance by the external servers 50 and described in the registration information 111 by the external servers 50.

FIG. 10 shows an example of the template 400 for registration processing (re-registration processing) of the application 301. FIG. 10 shows an example of content described using a tag format in the template 400. The template 400 in FIG. 10 is generated based on the registration information 111. As can be understood by comparing FIG. 10 with FIG. 9, the template 400 (FIG. 10) has the same content as the registration information 111 (FIG. 9), with the exception that the network identification information (e.g., IP address "192.168.0.10" and host name "SaaSGateway01") is not described (the corresponding fields are blank).

In step S13, the external server 50 transmits the registration command to the registration target device (MFP 10) via the intermediate server 30. Specifically, the external server 50 transmits the registration command to the intermediate server 30. The registration command is a command for registering the application 301 in the registration target device (MFP 10) as an application to be used, and includes the aforementioned registration information 111 and the information for designating the registration destination device (e.g., MFP 10a). The external server 50 also transmits the template 400 for re-registering the application 301 to the intermediate server 30.

In step S14, upon receiving the registration command (including the registration information 111 and the designation information described above) from the external server 50, the intermediate server 30 transmits the registration information 111 to the device (registration destination device) 10a designated by the designation information and causes the MFP 10a to register the registration information 111.

To be more specific, the registration control unit 41 of the intermediate server 30 transmits the registration information 111 to the MFP 10a, which is the registration destination device designated by the designation information described above, on the basis of the registration command (step S14). Note that the transmission destination address (IP address) of the MFP 10a designated by the designation information may be specified using a data table 161 (described later) shown in FIG. 12, for example. Upon receiving the registration information 111 transmitted from the external server 50 from the intermediate server 30, the registration control unit 21 of the MFP 10 regards that a registration request based on the registration information 111 has been issued, and registers information regarding the application 301 in the MFP 10, using the registration information 111 (step S15). When the MFP 10 has performed such a registration operation, a button for using the application 301 may be displayed on the operation screen 102 as shown in FIG. 7.

In this way, the intermediate server 30 (specifically, the registration control unit 41) transmits the registration information 111 regarding the application software service to the MFP 10 on the basis of the information received from the external server 50, and causes the MFP 10 to execute the operation of registering the application software service. The registration operation can also be referred to as an operation of pre-registering, in the MFP 10, information for receiving the application software service by accessing the external server 50 from the MFP 10 via the intermediate server 30.

In step S16, the storage control unit 43 of the intermediate server 30 stores the received template 400 in the storage unit 35 of the intermediate server 30. The storage control unit 43 also stores a data table 151 that defines a correspondence relationship between the template 400 and the device, i.e., a correspondence relationship between each SaaS application 300 and each MFP 10, in the storage unit 35. For example, the data table 151 in FIG. 11 defines the correspondence between the template identifier (template ID) of the template 400 for each application 300 and the registration target device (device ID) of the application.

FIG. 11 shows that a template 401 (see FIG. 10) with a template identifier (template ID) of "AppTemplate_0001" for the application 301 is associated with the MFP 10a having a device identifier (device ID) of "device_0001." If the application 301 is usable not only by the MFP 10a, but also by the MFP 10b, the template 401 (with a template identifier of "AppTemplate_0001") is associated with the MFP 10a that has a device identifier of "device_0001" and the MFP 10b that has a device identifier (device ID) of "device_0002."

In FIG. 11, a case is assumed in which the MFP 10a is also able to use the application 302, and the application 302 is only usable by the MFP 10a among the plurality of MFPs 10. In this case, as illustrated in FIG. 11, a template 402 with a template identifier (template ID) of "AppTemplate_0002" for the application 302 is associated with the MFP 10a having a device identifier (device ID) of "device_0001."

It is also assumed that the intermediate server 30 stores a data table 161 as illustrated in FIG. 12 in advance in the storage unit 35. The data table 161 in FIG. 12 stores data indicating that the network address (local IP address) of the MFP 10a (with a device ID of "device_0001") is "192.168.0.11". The data table 161 also shows data indicating that the network address (local IP address) of the MFP 10b (with a device ID of "device_0002") is "192.168.0.12" and data indicating that the network address (local IP address) of the MFP 10c (with a device ID of "device_0003") is "192.168.0.13".

Through this application registration operation, the application 301 is registered in the MFP 10, and the button 121 for using the application 301 is displayed on the operation screen 102 (FIG. 7) of the MFP 10. When a user has pressed the button 121, the MFP 10 is thus able to access the external server 50, using the registration information 111 and use the application 301.

Incidentally, as described previously, there are cases in which the IP address of the intermediate server is changed as a result of a change in a company's LAN configuration due to reorganization or the like within the company. If the IP address of the intermediate server has been changed, the MFPs 10 cannot use the old IP address to specify the intermediate server in the network. That is, the intermediate server 30 cannot communicate with the MFPs 10 without any action.

In order to prevent such a situation, the operation of registering the application 301 (e.g., steps S11 to S15 in FIG. 6) may be performed again, using the client 70 after the update of the network identification information (e.g., IP address) regarding the intermediate server 30. Such a re-registration operation by the user, however, imposes a heavy burden on the user.

In view of this, the present embodiment describes an example of the case in which the intermediate server 30 performs a re-registration operation (in other words, an automatic proxy registration operation performed by the intermediate server 30) on the MFP 10, as will be described below, (without using the external server 50). To be more specific, the intermediate server 30 generates re-registration information 112, using the template 400 and executes an operation of reregistering the application 301 in the MFP 10, using the re-registration information 112. In this case, the intermediate server 30 automatically executes the re-registration operation, thus avoiding an increase in the burden on the user.

1-6. Proxy Registration Operation (Re-Registration Operation) by Intermediate Server 30

Figure 13:
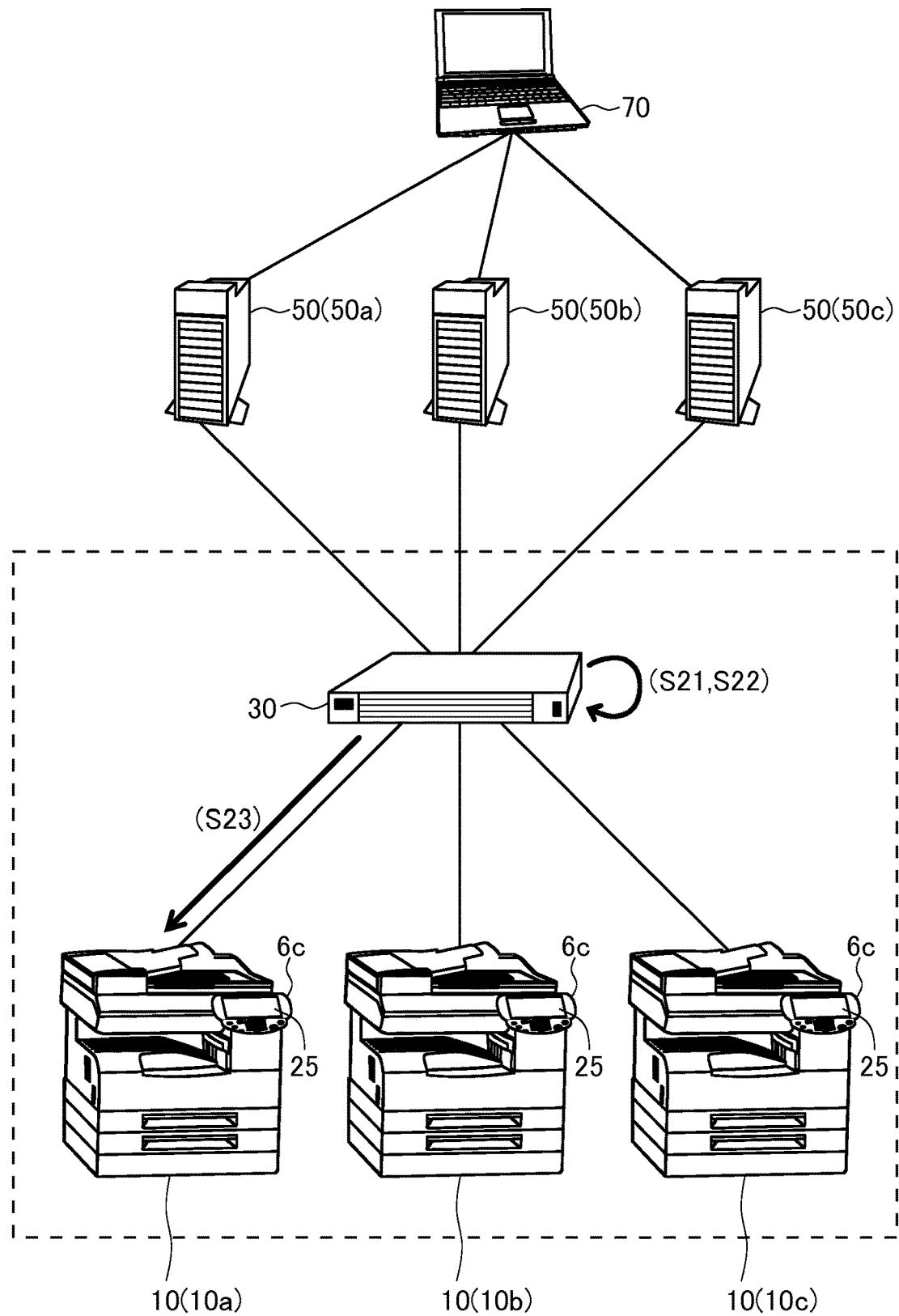
FIG. 13 is a conceptual diagram illustrating an outline of a re-registration operation.

Next, the operation of re-registering the application 301 (the proxy registration operation by the intermediate server 30) will be described with reference to FIGS. 13 and 14. FIG. 13 is a conceptual diagram illustrating an overview of the re-registration operation, and FIG. 14 is a timing chart showing an example of the re-registration operation.

As illustrated in FIG. 14, first, the detection unit 44 of the intermediate server 30 detects that the network identification information (here, the IP address (more specifically, the local IP address)) regarding the intermediate server 30 has been changed, and acquires a new IP address of the device (intermediate server 30) in step S21, and the procedure proceeds to step S22. From step S22 onward, the intermediate server 30 automatically performs a proxy registration operation (re-registration operation). Here, description will be given assuming that it has been detected that the IP address of the intermediate server 30 has been changed from "192.168.0.10" to "192.168.0.20" (i.e., the new IP address "192.168.0.20" has been acquired).

In step S22, the re-registration control unit 42 of the intermediate server 30 generates registration information (also referred to as "re-registration information 112") (see FIG. 15) for registering the application in the MFP 10 after the change in the network identification information (e.g., network address), on the basis of the template 400 or the like stored in the storage unit 35.

FIG. 15 shows an example of the re-registration information 112 regarding the application 301. The re-registration information 112 also contains the changed new network identification information (e.g., the network address and the host name) regarding the intermediate server 30. The re-registration information 112 is constituted by describing the changed IP address (local IP address) "192.168.0.20" and host name "SaaSGateway01" of the intermediate server 30 in the corresponding fields of the template 401.

To be more specific, the re-registration control unit 42 determines the application 301 as an update target application from among the plurality of applications 300. The re-registration control unit 42 then extracts the template 401 corresponding to the application 301 from among a plurality of templates 400 stored in the storage unit 35. The re-registration control unit 42 further specifies a target device corresponding to the template 401 on the basis of the data table 151 (FIG. 11) and thereby specifies a re-registration target device corresponding to the application 301. In the present example, the re-registration control unit 42 specifies the MFP 10a ("device_0001") corresponding to the template 401 ("AppTemplate_0001") as a re-registration target device corresponding to the application 301. Then, the re-registration control unit 42 registers the changed network identification information (network address) regarding the intermediate server 30 in the corresponding fields of the template 401 by overwriting the previous information. Specifically, the changed IP address (local IP address) "192.168.0.20" and host name "SaaSGateway01" of the intermediate server 30 are registered in the corresponding fields of the template 401 by overwriting the previous information to generate the re-registration information 112 (FIG. 15).

In step S23, the re-registration control unit 42 of the intermediate server 30 transmits the re-registration information 112 to the registration target device, i.e., the MFP 10, and causes the MFP 10 to register (reregister) the application

301. To be specific, the re-registration control unit 42 specifies a transmission target device (MFP 10*a*) corresponding to the application 301 on the basis of the data table 151 (FIG. 11) and further specifies the IP address "192.168.0.11" corresponding to the transmission target device (MFP 10*a*) on the basis of the data table 161 (FIG. 12). The re-registration control unit 42 then transmits the re-registration information 112 to the IP address "192.168.0.11". In other words, a command to re-register the application 301 is transmitted to the MFP 10*a* (IP address "192.168.0.11").

In step S24, upon receiving the re-registration information 112 from the intermediate server 30, the MFP 10 regards that a registration request (re-registration command) based on the re-registration information 112 has been issued, and performs an operation of re-registering the application (application software service) 301 on the basis of the re-registration information 112. This re-registration operation is performed by the registration control unit 21 of the MFP 10, for example.

The re-registration information 112 contains the same content as that of the registration information 111 (FIG. 9), with the exception that it also contains the changed (new) network identification information regarding the intermediate server 30. In steps S23 and S24, the re-registration control unit 42 performs a registration operation (re-registration operation) using the re-registration information 112, which is similar to the registration operation (steps S14 and S15 (FIG. 6)) performed by the registration control units 61, 41, and 21 using the registration information 111.

In this way, the intermediate server 30 (specifically, the re-registration control unit 42) generates the re-registration information 112 regarding the application software service on the basis of the template 400, transmits the re-registration information 112 to the MFP 10, and causes the MFP 10 to execute the re-registration operation of re-registering the application software service without depending on communications with the external server 50. Note that the re-registration operation can also be referred to as an operation of re-registering (in advance) in the MFP 10, information for receiving the application software service by accessing the external server 50 from the MFP 10 via the intermediate server 30.

This allows the MFP 10 to acquire the updated network address or the like of the intermediate server 30 and use the application 301 again by using the updated network address or the like. Specifically, when the user has pressed the button 121 on the operation screen 102 (FIG. 7), the MFP 10 is able to use the application 301 again through communications with the external server 50 via the intermediate server 30.

According to the operations described above, when the network identification information regarding the intermediate server 30 has been changed, the intermediate server 30 automatically performs the re-registration operation on the MFP 10, using the template 400 (in step S23, for example). This prevents an increase in the burden on the user.

Figure 18:
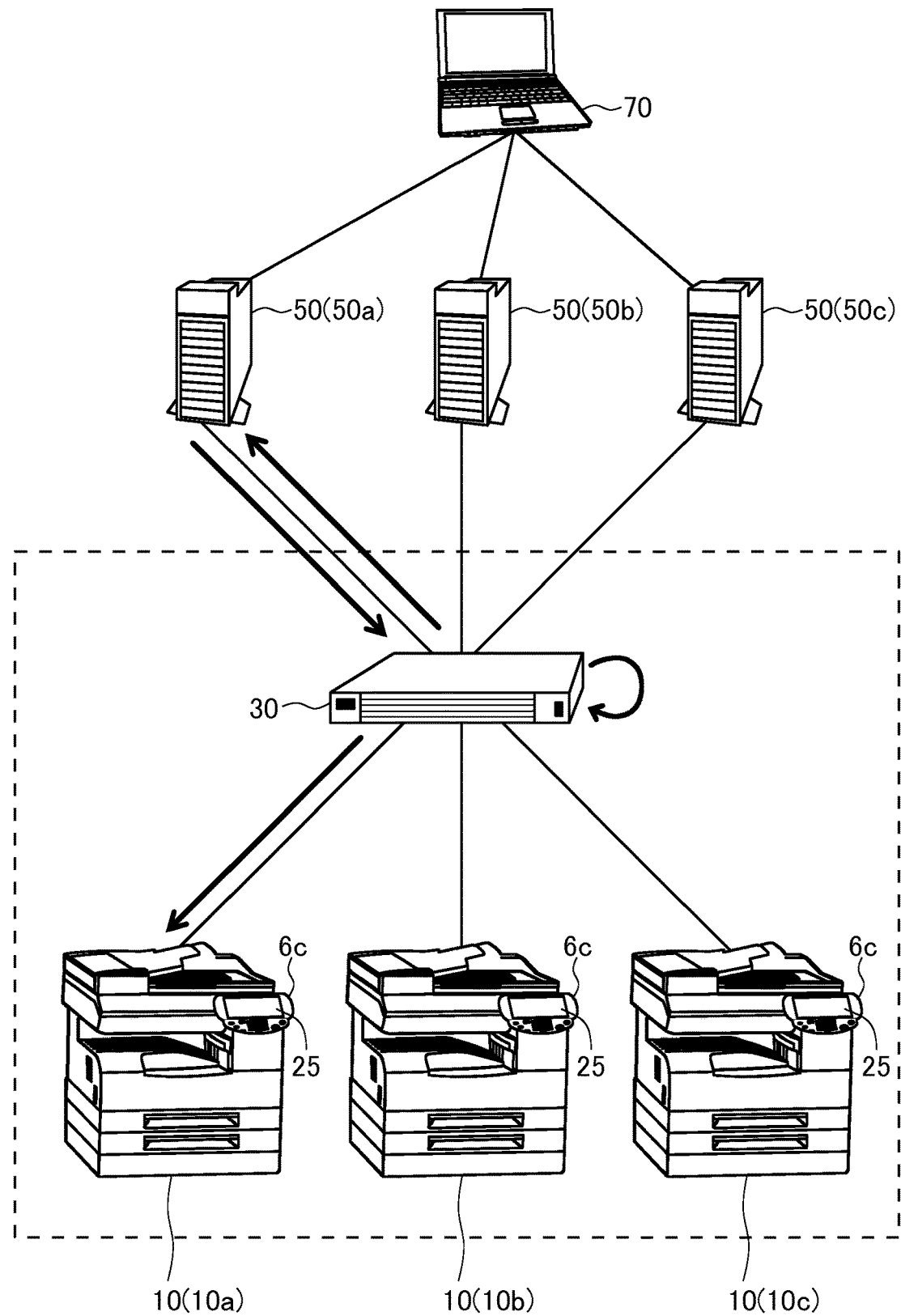
FIG. 18 is a conceptual diagram illustrating a re-registration operation according to a comparative example.

Here, a case is also conceivable in which a registration operation (also referred to as a re-registration operation according to a comparative example) similar to the initial registration operation performed using the external server 50 is automatically performed, using the changed IP address or the like of the intermediate server 30 (see FIG. 18, for example). Note that such a re-registration operation according to the comparative example is performed through communications between the intermediate server 30 and an external server 50, as will be described next.

FIG. 18 is a conceptual diagram illustrating the re-registration operation according to the comparative example. In the comparative example, when the intermediate server 30 has detected a change in its network identification information, the intermediate server 30 first transmits the changed network identification information regarding the intermediate server 30 and a re-registration request for re-registering the application 301 to the external server 50 (50*a*). In response to this re-registration request, the external server 50 transmits a registration command to the MFP 10 via the intermediate server 30. Such a re-registration operation may be performed in order to reflect the changed network identification information regarding the intermediate server 30 to the registration content in the MFP 10.

However, the comparative example involves the exchange of information between the intermediate server 30 and the external server 50 and therefore requires data communications with the external server 50 via a network outside the LAN (e.g., the Internet). This increases a communication load on the network (e.g., the Internet) outside the LAN, as compared with the above-described embodiment. In other words, the above-described embodiment, in which the intermediate server 30 performs a re-registration operation on the MFP 10 inside the LAN without requiring communications with the external server 50, is able to prevent an increase in network load on the network outside the LAN.

In addition, the communication speed in a LAN is typically faster than that of an external network. Accordingly, operations not involving communications outside the LAN can shorten the communication time required when re-registering an application software service and can also shorten the time required for re-registration.

Moreover, preventing an increase in the network load on a network outside the LAN can avoid an adverse effect on other processing using the external network.

Since re-registration is performed through communications within the LAN, there is little concern about security (e.g., concern about unauthorized access from outside the LAN) as compared with the case in which re-registration is performed via an external network using an external server as illustrated in FIG. 18.

2. Second Embodiment

A second embodiment is a variation on the first embodiment. The following description focuses on differences from the first embodiment.

The above-described first embodiment takes the example of the form in which the re-registration operation (steps S23 and S24) is performed immediately after detection of a change in the network address of the intermediate server 30 itself. The present invention is, however, not limited to this example. For example, the operations of steps S23 and S24 may be started on condition that the MFP 10 is in a low-load condition at the time of detection of a change in the network address of the intermediate server 30 itself. The second embodiment describes such a configuration.

In the second embodiment, the registration operation by an external server 50 registering an application 300 in an MFP 10 is performed in the same manner as in FIG. 6. Then, a re-registration operation illustrated in FIG. 16 is performed, instead of the re-registration operation in FIG. 14. The following description focuses on differences from FIG. 14 with reference to FIG. 16.

Steps S21 and S22 in FIG. 16 are performed in the same manner as those in FIG. 14.

Then, the processing of steps S26 and S27 is performed prior to execution of the processing of step S23. Specifically, first, the intermediate server 30 (specifically, the re-registration control unit 42) inquires of the MFP 10 about the processing load condition of the re-registration target, i.e., the MFP 10, in step S26. In step S27, the MFP 10 determines whether or not its own load condition is a "low-load condition" (e.g., a condition where the CPU operation rate is lower than a predetermined threshold value), which is a condition in which the load on the MFP 10 itself is lower than a predetermined criterion. The MFP 10 then transmits load condition information (i.e., "low-load condition" or "non-low-load condition") indicating whether or not the MFP 10 itself is in the "low-load condition," to the intermediate server 30. For example, if the MFP 10 is executing another job (e.g., a print output job), it is determined that the MFP 10 is not in the low-load condition, and a determination result indicating that the MFP 10 is in the "non-low-load condition" is transmitted from the MFP 10 to the intermediate server 30. On the other hand, if the MFP 10 is not executing another job and is in the standby state, a determination result indicating that the MFP 10 is in the "low-load condition" is transmitted from the MFP 10 to the intermediate server 30.

The intermediate server 30 performs processing in accordance with the load condition information. The intermediate server 30 that has received a determination result indicating the "non-low-load condition" repeatedly performs the processing of steps S26 and S27. On the other hand, the intermediate server 30 that has received a determination result indicating the "low-load condition" performs the processing of steps S23 and S24. The processing of steps S23 and S24 is performed in the same manner as in the first embodiment.

With the operations described above, the second embodiment can achieve effects similar to those of the first embodiment. Moreover, the intermediate server 30 also performs the operation of transmitting the re-registration information to the MFP 10 and causing the MFP 10 to re-register the application 301, on condition that the MFP 10 is determined to be in the "low-load condition" at the time of detection of a change in the network address of the intermediate server 30 itself. This can suppress or avoid a delay in a job that is currently being executed by the MFP 10 because the re-registration operation is performed on condition of the MFP 10 being in the "low-load condition."

3. Third Embodiment

The above embodiments take the example of the case in which only the network address of the intermediate server 30 is changed as an example of changing the network configuration of the LAN, and the re-registration operation is performed on the MFP 10 in response to the change in the network address.

Depending on the situation, there are also cases in which not only the network address of the intermediate server 30 but also the network addresses of the MFPs 10 (10a, 10b, and 10c) are changed.

In such a case, for example, new network addresses of the MFPs 10 after the change in the network configuration of the LAN may be acquired immediately before execution of step S23, for example, and the MFPs 10 may be accessed using the new network addresses. Note that the new network addresses of the MFPs 10 may be acquired using MAC addresses (of the MFPs 10) stored in a data table 162 (see FIG. 17). The data table 162 is stored in the intermediate server 30, instead of the data table 161 (FIG. 12). The data table 162 defines the host names and Media Access Control (MAC) addresses of the MFPs 10, for example, in addition to the IP addresses of the MFPs 10.

The third embodiment describes such a configuration. The third embodiment is a variation on the first embodiment. The following description focuses on differences from the first embodiment.

Specifically, when a change in the network address of the intermediate server 30 has been detected (step S21), the intermediate server 30 acquires the changed IP address of the MFP 10a, using the MAC address of the MFP 10a. Thus, when the IP address (local IP address) of the MFP 10a is changed from "192.168.0.11" to another IP address, the intermediate server 30 is able to acquire the changed IP address (e.g., "192.168.0.21") of the MFP 10a. Similarly, the changed IP address "192.168.0.22" of the MFP 10b can be acquired using the MAC address of the MFP 10b and the changed IP address "192.168.0.23" of the MFP 10c can be acquired using the MAC address of the MFP 10c.

By using the acquired new IP addresses, the intermediate server 30 is capable of favorably communicating with the MFPs 10 having the changed network addresses in step S23 or the like. This consequently allows the intermediate server 30 to appropriately perform the re-registration operation.

Note that the same modification is also possible with the second embodiment. Specifically, the new network addresses of the MFPs 10 after the change in the network configuration of the LAN may be acquired in step S21 (FIG. 16), and the acquired new IP addresses may be used in step S26. This allows the intermediate server 30 to favorably communicate with the MFPs 10 having the changed network addresses and consequently allows the intermediate server 30 to appropriately acquire the load conditions of the MFPs 10.

4. Variations

While the above has been description of embodiments of the present invention, the present invention is not limited to the examples described above.

For example, in the above-described embodiments, the templates 400 stored in the intermediate server 30 are generated in advance by the external servers 50 on the basis of the registration information 111 and are transmitted separately from the registration information 111 from the external servers 50. The present invention is, however, not limited to this. It is sufficient for the templates 400 stored in the intermediate server 30 to be based on the registration information 111. Thus, for example, the intermediate server 30 may generate the templates 400 on the basis of the registration information 111. Alternatively, the registration information 111 transmitted from the external server 50 may be directly stored as the templates 400 in the intermediate server 30.

While the above-described embodiments take the example of the case in which a single device is specified as a registration target from among a plurality of devices, the present invention is not limited thereto, and two or more of the plurality of devices may be specified as registration targets. For example, by checking a check box on the left of "Device 2" (MFP 10b), both "Device 1" (MFP 10a) and "Device 2" (MFP 10b) may be specified as registration target devices for the application 301. Specifically, steps S12 to S16 may be (repeatedly) performed for each of the remaining registration target devices, i.e., the MFPs 10. In addition, after the detection of step S21, steps S22 to S24

(and steps S26 and S27) may be performed for each of the remaining registration target devices, i.e., the MFPs 10.

While the above-described embodiments take the example of the registration and re-registration operations of registering and re-registering a single application 300, the present invention is not limited thereto. For example, the registration and re-registration operations of registering and re-registering a plurality of applications 300 may be performed in the same manner.

In particular, an increase in network load can be more markedly suppressed in the case where a re-registration operation regarding a plurality of devices and/or a plurality of applications is performed.

While the above-described embodiments mainly take the example of the case in which the "IP address" of the intermediate server 30 is changed in the network identification information regarding the intermediate server 30, the present invention is not limited thereto. The idea of the present invention is also applicable to other cases in which other identification information such as the "host name" of the intermediate server 30 is changed.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. An information communication system comprising:
an information processing apparatus located in a local area network;
an external server that is located outside said local area network, and provides an application software service to said information processing apparatus via network communications; and
an intermediate server that is located in said local area network, and acts as a relay between said external server and said information processing apparatus, wherein
said application software service is provided by said external server being accessed by said information processing apparatus via said intermediate server, said application software service being hosted by said external server such that said information processing apparatus executes said application software service by communicating with said external server via said intermediate server,
said intermediate server includes a hardware processor configured to transmit registration information regarding said application software service to said information processing apparatus on the basis of information received from said external server, and cause said information processing apparatus to execute a registration operation of registering information for receiving said application software service in said information processing apparatus,
said intermediate server includes a storage device that stores a template that is based on said registration information, said template being a template for re-registration information that is for re-registering said application software service in said information processing apparatus,
said intermediate server includes a detector that automatically detects a change in an IP address of said intermediate server itself, and
said hardware processor of said intermediate server is configured to, when the change in said IP address of said intermediate server is detected, generate said re-registration information that includes a changed new IP address of said intermediate server on the basis of said template, perform control such that said re-registration information is automatically transmitted to said information processing apparatus, and cause said information processing apparatus to automatically execute a re-registration operation of re-registering said application software service.

2. The information communication system according to claim 1, wherein said hardware processor is configured to inquire of said information processing apparatus about a processing load condition of said information processing apparatus, and on condition that it is determined that said information processing apparatus is in a low-load condition in which a load on said information processing apparatus is lower than a predetermined criterion, perform control such that said re-registration information is transmitted to said information processing apparatus, and cause said information processing apparatus to execute said re-registration operation.

3. The information communication system according to claim 1, wherein
said storage device further stores a MAC address of said information processing apparatus,
said hardware processor of said intermediate server is further configured to specify a new IP address of said information processing apparatus after the change in a network configuration of said local area network, on the basis of said MAC address, and
said hardware processor of said intermediate server is configured to perform control such that said re-registration information is transmitted to said information processing apparatus through communications with said information processing apparatus, using said new IP address.

4. An intermediate server that acts as a relay between an information processing apparatus located in a local area network and an external server located outside said local area network, the intermediate server comprising:
a hardware processor configured to transmit registration information regarding an application software service of said external server to said information processing apparatus on the basis of information received from said external server, said application software service being hosted by said external server such that said information processing apparatus executes said application software service by communicating with said external server via said intermediate server, and cause said information processing apparatus to execute a registration operation of pre-registering information for receiving said application software service in said information processing apparatus;
a storage device that stores a template that is based on said registration information, said template being a template for re-registration information that is for re-registering said application software service in said information processing apparatus;
a detector that automatically detects a change in an IP address of said intermediate server itself that is located in said local area network; and said hardware processor being configured to, when the change in said IP address of said intermediate server is detected, generate re-registration information that includes a changed new IP address of said intermediate server on the basis of said template, perform control such that said re-registration information is automatically transmitted to said information processing apparatus, and cause said information processing apparatus to automatically execute a re-registration operation of re-registering said application software service.

5. The intermediate server according to claim 4, wherein said hardware processor is configured to inquire of said information processing apparatus about a processing load condition of said information processing apparatus, and on condition that it is determined that said information processing apparatus is in a low-load condition in which a load on said information processing apparatus is lower than a predetermined criterion, perform control such that said re-registration information is transmitted to said information processing apparatus, and cause said information processing apparatus to execute said re-registration operation.

6. The intermediate server according to claim 4, wherein
said storage device further stores a MAC address of said information processing apparatus,
said hardware processor is further configured to specify a new IP address of said information processing apparatus after the change in a network configuration of said local area network, on the basis of said MAC address, and
said hardware processor of said intermediate server is configured to perform control such that said re-registration information is transmitted to said information processing apparatus through communications with said information processing apparatus, using said new IP address.

7. A non-transitory computer-readable recording medium that records a program for causing a computer built into an intermediate server that acts as a relay between an information processing apparatus located in a local area network and an external server located outside said local area network to execute the steps of:
a) transmitting registration information regarding an application software service of said external server to said information processing apparatus on the basis of information received from said external server, said application software service being hosted by said external server such that said information processing apparatus executes said application software service by communicating with said external server via said intermediate server, and causing said information processing apparatus to execute a registration operation of registering information for receiving said application software service in said information processing apparatus;
b) storing a template that is based on said registration information, said template being a template for re-registration information that is for re-registering said application software service in said information processing apparatus;
c) automatically detecting a change in an IP address of said intermediate server itself that is located in said local area network; and
d) when the change in said IP address of said intermediate server is detected, generating re-registration information that includes a changed new IP address of said intermediate server on the basis of said template, automatically transmitting said re-registration information to said information processing apparatus, and causing said information processing apparatus to automatically execute a re-registration operation of re-registering said application software service.

8. The non-transitory computer-readable recording medium according to claim 7, wherein the program for causing the computer built into the intermediate server includes executing the steps of:
inquiring of said information processing apparatus about a processing load condition of said information processing apparatus, and
transmitting, on condition that it is determined that said information processing apparatus is in a low-load condition in which a load on said information processing apparatus is lower than a predetermined criterion, said re-registration information to said information processing apparatus, and causes said information processing apparatus to execute said re-registration operation.

9. The non-transitory computer-readable recording medium according to claim 7, wherein the program for causing the computer built into the intermediate server includes executing the steps of:
storing a MAC address of said information processing apparatus,
specifying a new IP address of said information processing apparatus after the change in a network configuration of said local area network, on the basis of said MAC address, and
transmitting said re-registration information to said information processing apparatus through communications with said information processing apparatus, using said new IP address.

* * * * *